United States Patent [19]

Barker

[11] Patent Number: 4,497,511
[45] Date of Patent: Feb. 5, 1985

[54] CONNECTORS FOR VESSELS OR PIPES

[75] Inventor: Allan D. Barker, Nerang, Australia

[73] Assignee: A.D. & R.E. Barker Pty. Ltd., Nerang, Australia

[21] Appl. No.: 403,655

[22] PCT Filed: Dec. 4, 1980

[86] PCT No.: PCT/AU80/00106
§ 371 Date: Aug. 2, 1982
§ 102(e) Date: Aug. 2, 1982

[87] PCT Pub. No.: WO82/01928
PCT Pub. Date: Jun. 10, 1982

[51] Int. Cl.³ .............................................. F16L 5/00
[52] U.S. Cl. .................................... 285/158; 285/178; 285/338; 285/298; 285/39
[58] Field of Search .............. 285/158, 178, 162, 198, 285/338, 298, 39, 3

[56] References Cited

U.S. PATENT DOCUMENTS

| | | | |
|---|---|---|---|
| 278,723 | 6/1883 | Monteath | 285/178 X |
| 653,524 | 7/1900 | Paradice | 285/178 X |
| 1,844,047 | 2/1932 | Smittle | |
| 2,295,416 | 9/1942 | Madison | 285/178 X |
| 2,440,452 | 4/1948 | Smith | |
| 2,510,023 | 5/1950 | La Barre | |
| 2,899,690 | 8/1959 | Clifford | 285/178 X |
| 3,012,252 | 12/1961 | Gaddy | |
| 3,263,244 | 8/1966 | Katz | 285/178 X |
| 3,504,383 | 4/1970 | Young | |
| 3,593,347 | 7/1971 | Nemiroff | |
| 3,844,585 | 10/1974 | Sands et al. | 285/3 |
| 4,014,053 | 3/1977 | Jones | 285/12 |

FOREIGN PATENT DOCUMENTS

| | | |
|---|---|---|
| 108494 | 9/1939 | Australia |
| 258221 | 8/1963 | Australia |
| 416853 | 4/1968 | Australia |
| 738638 | 7/1966 | Canada |
| 1965246 | 7/1970 | Fed. Rep. of Germany |
| 1256926 | 2/1961 | France |
| 1539095 | 8/1968 | France |
| 1382348 | 1/1975 | United Kingdom |

Primary Examiner—Richard J. Scanlan, Jr.
Attorney, Agent, or Firm—Kimmel, Crowell & Weaver

[57] ABSTRACT

Connector for vessels or pipes which includes first and second connection members (20, 60) which are clamped and sealed together. The second connection member (60) is closed by a wall (51) through which a hole (53) is cut after the vessels or pipes have been positioned. An insertion tool (90) is used to engage a clamping bracket (40) with the wall (51) to secure the connection members together when the first connection member (20) is fitted to the hole (53). A resilient sealing ring (30) surrounds the hole (53) and is compressed between the connection members (20, 60).

An O-ring seal (70) on the second connection member (60) allows for relative movement between the vessels or pipes.

The connector may be installed from inside a vessel or pipe where access is restricted and the connector allows for misalignment between the inlets or outlets of the vessels or pipes.

10 Claims, 4 Drawing Figures

CONNECTORS FOR VESSELS OR PIPES

BACKGROUND OF THE INVENTION (1) Field of the Invention

THIS INVENTION relates to a connector for connecting vessels or pipes together.

(2) Description of the Prior Art

There are many applications where vessels or pipes must be connected to pipework already installed. One example is the connection of baths, showers and urinals to drainage pipework which is installed during the construction of buildings.

It has been found in practice that forming an effective connection between such a vessel and such prelocated pipework is extremely difficult. Firstly, it is rare to find that the inlet or outlet of the vessel is accurately aligned with the pipework. Secondly, the connections generally available are rigid and cannot accommodate any relative movement between the vessel and the pipework at the connection point. Should any movement occur, e.g. when a person steps into a bath, the sealing of the connection may be damaged or destroyed. Thirdly, the connection can only be made after the vessel is installed and, as access to the connector is often restricted, this makes the connection operation very difficult.

In an attempt to overcome the problem of misalignment between the inlet or outlet of the vessel and the pipework, a number of solutions have been proposed. One of these which has come to the applicant's attention is that disclosed in U.S. Pat. No. 4,014,053 (Jones). The connector disclosed in that Patent uses an offset flange having an opentopped body to which is fitted a cover selected from a range of covers having holes at relative dispositions in the cover so that the plumber selects a cover which will provide the closest alignment between the hole in the cover and the inlet or outlet of the vessel. This connector is not satisfactory as it requires the plumber to have a supply of such covers (allowing for misalignment in two axes) and access to the connector may be restricted.

SUMMARY OF THE PRESENT INVENTION

It is therefore an object of the present invention to provide a connection which can be easily and simply sealed.

It is a preferred object to provide a connection which will allow some relative movement between the vessels or pipework without damaging or destroying the seal.

It is a further preferred object to provide a connector for connecting vessels or pipes which are misaligned in at least one axis.

It is a still further preferred object to provide a connector which can be assembled to form a connection where the connection point is not readily accessible and the connection operation may be carried out from inside the vessel.

Other preferred features will become apparent from the following description.

In one aspect the present invention resides in a connector for connecting vessels or pipes comprising:

a first connection member adapted to be connected to a first vessel or pipe;

a second connection member adapted to be connected to a second vessel or pipe; and clamping means adapted to secure said first and second connection members together; characterized in that:

said second connection member has a portion of greater diameter than the diameter of said first connection member; and a wall closing the said portion, said wall being adapted to have a hole formed therein to receive said first connection member to form the connection between said vessels or pipes.

Preferably the connector further includes resilient sealing means surrounding the hole formed in the wall and adapted to be compressed between said first and second connection members to form a fluid-tight seal therebetween.

Preferably the resilient sealing means has an annular body formed of resilient material, e.g. rubber, neoprene or plastics material, a peripheral groove in said body to receive and engage an outlet of the first vessel or pipe; and an internal laterally extending peripheral lip adapted to engage the wall of the second connection member.

Preferably the clamping means includes:

a clamping bracket adapted to engage the face of the wall spaced from the first connection means; and fastening means interconnecting said first connection means and said clamping bracket.

Preferably the clamping bracket includes:

a body with a maximum dimension less than the diameter of the hole formed in the wall; and a plurality of substantially radially extending arms each of a radial length greater than the radius of the hole.

Preferably the first connector means includes a tubular outlet body fitted to an outlet of the first vessel or a pipe and a peripheral laterally extending flange adapted to engage the face of the wall of the first vessel or pipe spaced from the second connection means.

Preferably the second connector means includes:

a substantially cylindrical tubular body adapted to be slidably received in an inlet of the second vessel or pipe;

slidable sealing means on the body to maintain a fluid-tight seal between the body and the inlet;

a frusto-conical portion connected to the body terminating in an axial peripheral flange; and the wall is connected to said flange to normally close the end of the second connection means adjacent the first connection member.

Preferably the slidable sealing means includes a flexible O-ring (e.g. of rubber, neoprene or plastics material) seated in but extending from a peripheral groove around the tubular body.

In a second aspect, the present invention resides in a connection between vessels or pipes incorporating the connector.

In a third aspect the present invention resides in a method of connecting vessels or pipes employing the connector.

BRIEF DESCRIPTION OF SEVERAL VIEWS OF THE DRAWINGS

To enable the invention to be fully understood, a preferred embodiment will now be described with reference to the accompanying drawings, in which:-

DETAILED DESCRIPTION OF THE PREFERRED EMBODIMENT

Figure 1:
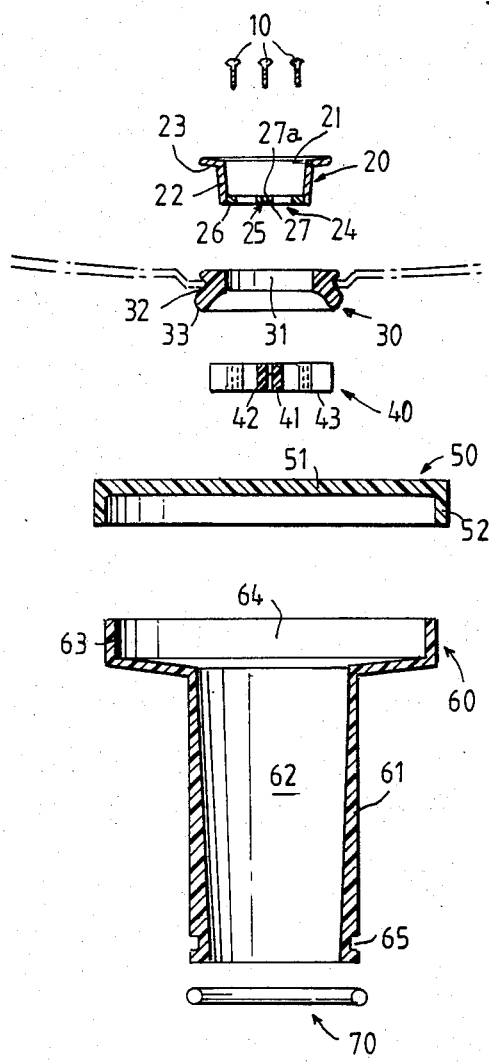
FIG. 1 is a sectional side view of the components of the connector before assembly.
Figure 2:
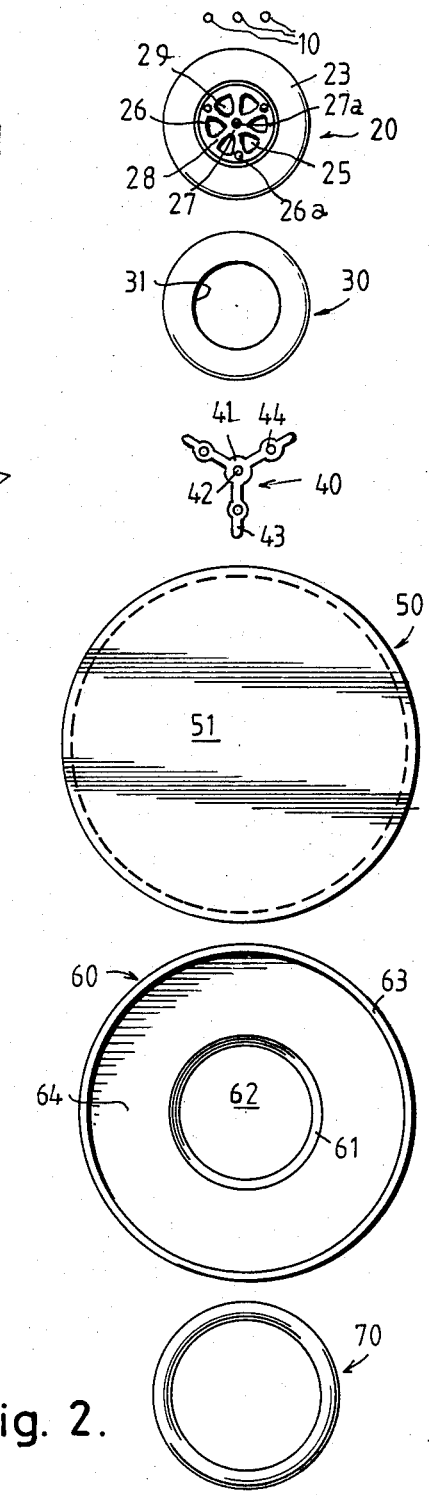
FIG. 2 is a plan view corresponding to FIG. 1.

Referring to FIGS. 1 and 2, the connector includes screws 10, grated outlet 20, washer 30, clamp bracket 40, clamping base 50, adaptor 60 and O-ring 70.

The screws 10 may be of any suitable type although screws with self-tapping threads are preferred.

The grated outlet 20 has an inlet mouth 21 connected to a tubular outlet body 22. A peripheral flange 23 is provided around the mouth 21. The outlet mouth 24 is provided with a grate 25 having a peripheral ring 26 and a central body 27 interconnected by radial arms 28 to form a series of outlet passages 29. An axial bore 27a is formed in the central body 27, while axial bores 26a are formed in the peripheral ring 26.

Washer 30 is substantially annular in plan, is formed of neoprene, rubber or a resilient plastics material and has an axial bore 31. The body of the washer has a peripheral groove 32 and an integral sealing lip 33.

Clamp bracket 40 has a central body 41 with a tapped axial bore 42 therethrough. Three arms 43 radiate from the central body and the midpoint of each arm is thicker in plan and has a plain axial bore 44 therethrough.

The cramping base 50 is substantially circular in plan and has a wall 51 provided with a laterally extending peripheral flange 52.

The adaptor 60 has a substantially cylindrical tubular body 61, with an axial bore 62 provided at one end with a frusto-conical portion 63 forming an inlet mouth 64. A peripheral groove 65 is formed around the body 61 adjacent the other end to receive and seat the annular O-ring 70.

The O-ring 70 is made of suitable resilient rubber, neoprene or other plastics material and is substantially circular in section.

The clamp bracket 40, clamping base 50 and adaptor 60 are preferably injection moulded from a suitable plastics material.

Figures 3, 4:
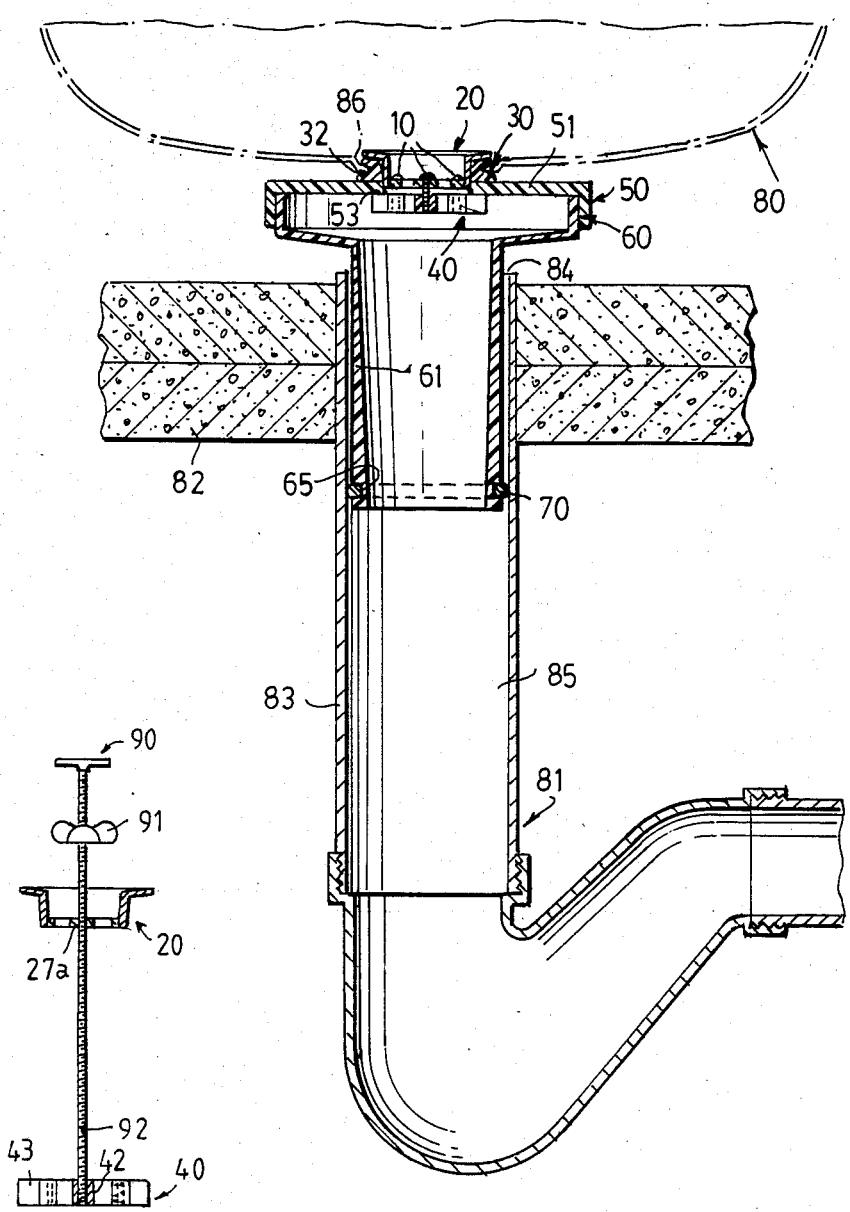
FIG. 3 is a sectional side view showing a connection between a vessel and a system of pipeworks.
FIG. 4 is a sectional view showing the tool used to assemble the connector.

Referring to FIGS. 3 and 4, the method of assembling the connection will now be described, where a vessel 80 (e.g. a bath) is to be connected to pipework 81 previously installed in floor 82. The pipework 81 includes a pipe 83 with an inlet mouth 84 above the floor.

O-ring 70 is fitted to the groove 65 on adaptor 60 and the adaptor 60 is fitted in the bore 85 of the pipe 83. The O-ring 70 forms a seal between the pipe 83 and the body 61 of the adaptor, while allowing relative sliding movement therebetween. The clamping base 50 is secured to the adaptor 60 by a "snap-lock" fitting or by suitable fasteners or glues to close the inlet mouth 64. Washer 30 is fitted to the vessel 80, the rim of vessel outlet 86 being engaged in peripheral groove 32 of the washer.

The vessel 80 is then positioned with the outlet 86 above the pipework. The operator cuts a hole 53 through the wall 51 of clamping base 50 using a hole-saw which passes down through the outlet 86 of the vessel. The hole-saw is withdrawn and the circular portion of wall 51, which has been cut out, is removed. Referring to FIG. 4, the operator now takes insertion tool 90, which has a wing-nut 91 screw-threadably mounted on threaded shank 92, and feeds the shank 92 through hole 27a in the grated outlet and then engages the shank in the threaded hole 42 in the clamp bracket 40.

By holding the tool 90 at an angle, the operator passes the clamp bracket 40 down through the outlet 86, washer 30 and hole 53 in the cramping base 50. The operator returns the tool 90 to the vertical and pulls it upwardly until the arms 43 engage the underside of the wall 51 (the arms spanning the hole 53).

The operator pushes the grated outlet 20 downwardly so that the tubular body 22 passes down through the bore 31 of washer 30.

The operator screws the wing-nut down the shank 92 to compress the washer 30 between the vessel 80 and the wall 51 of the clamping base 50 to form a seal therebetween.

The holes 26a in the grated outlet 20 are aligned with the holes 44 in the arms 43 of the clamp bracket 40 and the screws 10 are fitted to secure the two components firmly together. Wing-nut 91 is released, and the shank 92 is unscrewed from the clamp bracket 40 to enable the tool 90 to be removed.

The connection between the vessel 80 and the pipework 81 has been completed.

If the vessel 80 moves relative to the pipework 81, any movement is taken up as adaptor 60 slidably moves in pipe 83, the O-ring 70 maintaining a secure seal.

Any misalignment between the outlet 86 of the vessel 80 and the inlet mouth 84 of the pipe 83 is accommodated as it is not necessary that hole 53 in wall 51 be cut directly above the bore 85 of the pipe 83. Therefore the connection can accommodate misalignment of the vessel 80 to the pipework 81 in all three axes and so the vessel can be easily connected to the pipework which has already been installed. Washer 30 and O-ring 70 ensure that a secure seal is always formed between the vessel 80 and the pipework 81.

It will of course be readily apparent to the skilled addressee that the connector may be used in any orientation. Where relative movement between, e.g. the vessel and the installed pipework does not occur, the sliding connection between the adaptor 60 and the pipe 81 can be replaced by a fixed joint.

Various changes and modifications may be made to the arrangement described and illustrated without departing from the scope of the present invention as defined in the appended claims.

I claim:

1. A connector for connecting vessels or pipes comprising:
   a first connection member (20) adapted to be connected to a first vessel or pipe (80);
   a second connection member (60) adapted to be connected to a second vessel or pipe (83);
   clamping means (40) adapted to secure said first and second connection members (20, 60) together;
   said second connection member (60) having a portion (63) of greater diameter than the diameter of said first connection member (20);
   a wall (51) closing said portion (63), said wall (51) having a hole (53) formed therein to receive said first connection member (20) to form the connection between said vessels or pipes (80, 83); and
   resilient sealing means (30) surrounding the hole (53) formed in the wall (51) and adapted to be compressed between said first and second connection members (20, 60) to form a fluid-tight seal therebetween.

2. A connector as claimed in claim 1 wherein said clamping means (40) is characterized by:
- a clamping bracket (40) adapted to engage the face of the wall (51) spaced from the first connection means (20); and
- fastening means (10) interconnecting said first connection means (20) and said clamping bracket (40).

3. A connector as claimed in claim 2 wherein said clamping bracket is characterized by:
- a body (41) with a maximum dimension less than the diameter of the hole (53) formed in the wall (51); and
- a plurality of substantially radially extending arms (43) each of a radial length greater than the radius of the hole (53).

4. A connector as claimed in claim 1 wherein the first connection member (20) is characterized by:
- a tubular outlet body (22) adapted to be fitted in the bore of the resilient sealing means (30); and
- a peripheral laterally extending flange (23) adapted to engage one end face of the sealing means (30) and being spaced from the second connection member (60).

5. A connector as claimed in claim 1 wherein the second connection member (60) is characterized by:
- a substantially cylindrical tubular body (61) adapted to be slidably received in an inlet (84) of the second vessel or pipe (83);
- slidable sealing means (70) on said tubular body (61) to maintain a fluid-tight seal between said tubular body (61) and said inlet (84);
- a frusto-conical portion connected to said tubular body (61) terminating in an axial peripheral flange (63); and
- said wall (51) is connected to said flange (63) to normally close the end of the second connection member (60) adjacent the first connection member (20).

6. A connector as claimed in claim 5 wherein said slidable sealing means (70) is characterized by:
- a flexible O-ring (70) seated in but extending from a peripheral groove (65) around said tubular body (61).

7. A connector as claimed in claim 1 wherein said resilient sealing means is characterized by:
- an annular body (30) of resilient material;
- a peripheral groove (32) in said body (30) to receive and engage an outlet (86) of the first vessel or pipe (80); and
- an internal laterally extending peripheral lip (33) adapted to engage the wall (51) of the second connection member (60).

8. A method of connecting a first vessel or pipe to a second vessel or pipe employing a connector of the type comprising a first connection member (20), a second connection member (60), and clamping means (40) to secure said first and second connection members (20, 60) together, said second connection member (60) being characterized by a portion (63) of greater diameter than the diameter of said first connection member and a wall (51) closing said portion (63), said method comprising the steps of:
- (a) connecting said second connection member (60) to said second vessel or pipe (83);
- (b) positioning the inlet or outlet (86) of said first vessel or pipe (80) adjacent to said second vessel or pipe (83);
- (c) forming a hole (53) in said wall (51) in alignment with said inlet or outlet (86);
- (d) placing said first connection member (20) in said hole (53) and connecting said first connection member (20) to said inlet or outlet (86) of said first vessel or pipe (80);
- (e) securing said first and second connection members (20, 60) with said clamping means (40); and
- (f) providing resilient sealing means (30) surrounding the hole (53) formed in the wall (51) and compressing said sealing means (30) between said first and second connection members (20, 60) to form a fluid-tight seal therebetween.

9. A method as claimed in claim 8 wherein step (e) is further characterized by:
- fitting said first connection member (20) and a clamping bracket (40) to an insertion tool (90);
- passing said clamping bracket (40) through said hole (53) in said wall (51) and engaging said clamping bracket (40) with the side of the wall (51) spaced from said first connection member (20);
- operating a nut (91) on said insertion tool (90) to secure said first and second connection members (20, 60) together;
- connecting said first and second connection members (20, 60) with fasteners (10); and
- removing said insertion tool (90).

10. A method as claimed in claim 8 wherein step (a) is further characterized by:
- providing a sealing ring (70) in a peripheral groove (65) around said second connection member (60) for slidable, sealable connection between said second connection member (60) and said second vessel or pipe (83).

* * * * *